US012619584B1

(12) United States Patent
Rauh et al.

(10) Patent No.: US 12,619,584 B1
(45) Date of Patent: May 5, 2026

(54) AUTOMATIC PREDICTION OF AND AVOIDANCE OF STATEMENT POOL CHURN

(71) Applicant: INTERNATIONAL BUSINESS MACHINES CORPORATION, Armonk, NY (US)

(72) Inventors: Nathan Jon Rauh, Rochester, MN (US); Mark Swatosh, Rochester, MN (US); James Stephens, Palisade, MN (US); Alex Seitzinger Motley, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/042,050

(22) Filed: Jan. 31, 2025

(51) Int. Cl.
*G06F 16/21* (2019.01)
*G06F 16/2458* (2019.01)

(52) U.S. Cl.
CPC ........ *G06F 16/217* (2019.01); *G06F 16/2458* (2019.01)

(58) Field of Classification Search
CPC ........................... G06F 16/217; G06F 16/2458
See application file for complete search history.

(56) References Cited

U.S. PATENT DOCUMENTS

| | | | | |
|---|---|---|---|---|
| 6,115,703 | A * | 9/2000 | Bireley ............. | G06F 16/24552 |
| | | | | 707/769 |
| 7,603,389 | B2 | 10/2009 | Holenstein et al. | |
| 7,653,620 | B2 * | 1/2010 | Arnold ................. | G06F 16/252 |
| | | | | 707/999.004 |
| 7,761,575 | B2 | 7/2010 | Srivastava et al. | |
| 10,642,735 | B2 | 5/2020 | Bastawala et al. | |
| 11,099,968 | B1 | 8/2021 | Snyder et al. | |
| 11,627,202 | B1 * | 4/2023 | Yadav .................... | G06F 8/656 |
| | | | | 709/217 |
| 11,914,590 | B1 * | 2/2024 | Plenderleith ...... | G06F 16/24552 |
| 2004/0049638 | A1 * | 3/2004 | Ashmore ............. | G06F 12/123 |
| | | | | 711/E12.072 |
| 2004/0172390 | A1 | 9/2004 | Srivastava et al. | |
| 2008/0191816 | A1 * | 8/2008 | Balachandran .... | H04N 21/2402 |
| | | | | 333/24 R |
| 2019/0197140 | A1 | 6/2019 | Lee et al. | |
| 2021/0073219 | A1 | 3/2021 | Barbas et al. | |
| 2022/0318218 | A1 * | 10/2022 | Lin .................... | G06F 16/2246 |
| 2024/0118808 | A1 | 4/2024 | Rauh et al. | |

* cited by examiner

*Primary Examiner* — Vaishali Shah
(74) *Attorney, Agent, or Firm* — Teddi E. Maranzano

(57) ABSTRACT

A computer implemented method, system, and program product are provided. In response to receiving a request for a structured query language (SQL) statement from a requestor, a current request count is incremented. A matching entry in a discards list is located, whereby the match comprises, a discarded SQL statement equaling the requested SQL statement. Based on there being the matching entry, the matching entry is removed from the discards list. A proximity between the current request count and a previous request count is created. A threshold is created based on a configurable number of times of a maximum SQL statement cache size. The poolability of the requested SQL statement is determined. The requested SQL statement is returned to the requestor. Periodically, maintenance is performed on the discards list.

20 Claims, 6 Drawing Sheets

AUTOMATIC PREDICTION OF AND AVOIDANCE OF STATEMENT POOL CHURN

BACKGROUND

The disclosure relates generally to an improved computer system and more specifically to managing statement pool churn.

Whether it is done directly by the application or indirectly by other layers of software in between, data access applications typically involve running parameterized structured query language (SQL) statements against a database. Many of the same SQL statements tend to be executed over and over again, often with differing parameters. Other SQL statements are executed infrequently, and usage patterns can vary over time. Pooling and reusing SQL statements would improve performance. However, pooling too many statements can lead to consuming too much resource, particularly memory, especially when combined with connection pooling. Some performance tuning options, such as capping statement pools, may result in frequently used statements being discarded in favor of those that are run less frequently.

It would be advantageous to automatically identify SQL statements that cause churn so that they can be kept out of statement pools, thereby achieving lower total statement pools sizes without the byproducts of churn and excessive memory consumption.

SUMMARY

According to one illustrative embodiment, a computer implemented method is provided. In response to receiving a request for a structured query language (SQL) statement from a requestor, a current request count is incremented. A matching entry in a discards list is located, whereby the match comprises, a discarded SQL statement equaling the requested SQL statement. Based on there being the matching entry, the matching entry is removed from the discards list. A proximity between the current request count and a previous request count is computed. A threshold is created based on a configurable multiple of a maximum SQL statement cache size. The poolability of the requested SQL statement is determined. The requested SQL statement is returned to the requestor. Periodically, maintenance is performed on the discards list.

Embodiments are further directed to computer systems, servers and computer program products having substantially the same features as the above-described computer implemented method.

DETAILED DESCRIPTION

Figure 1:
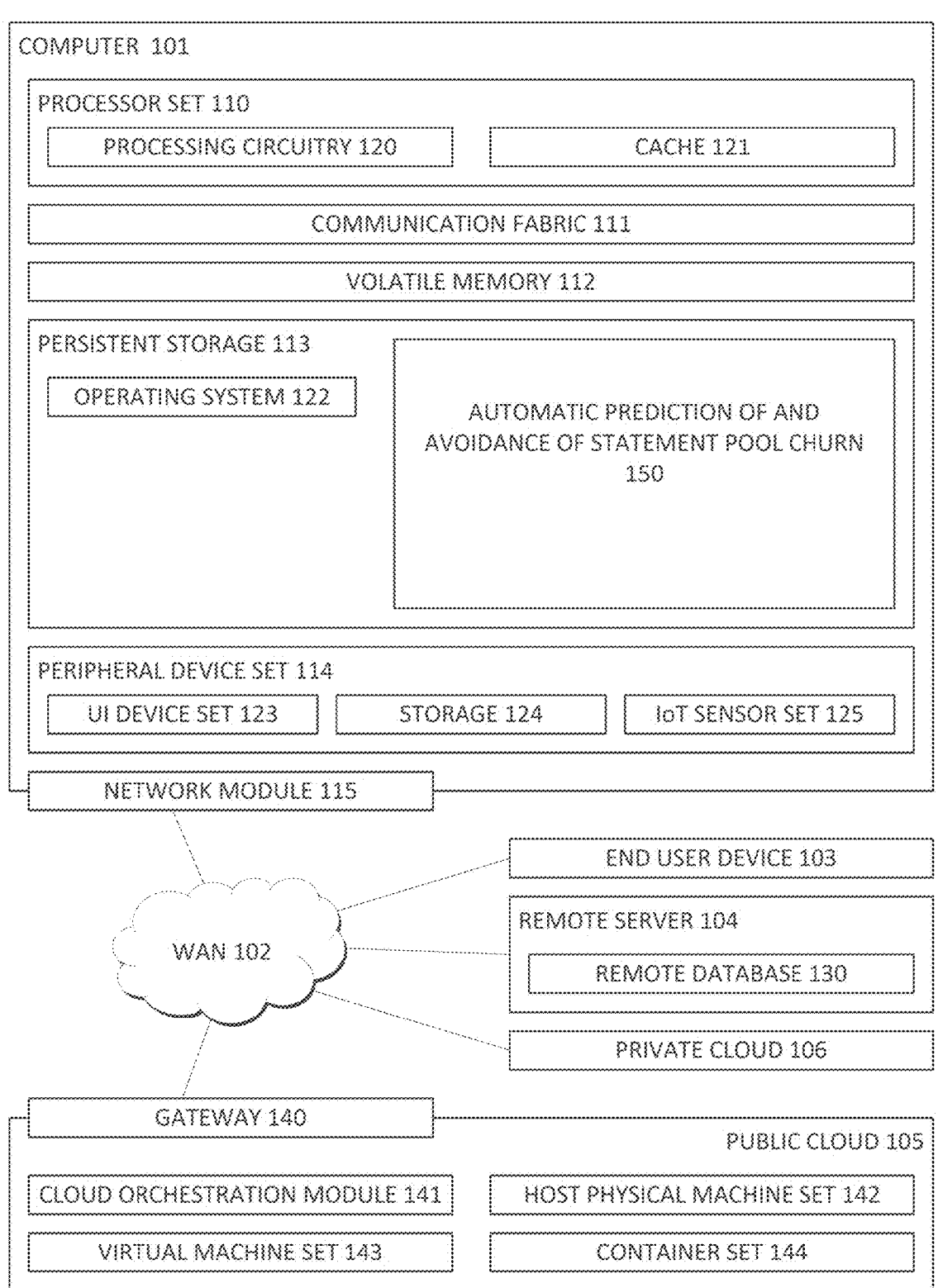
FIG. 1 is a block diagram of a computing environment in which illustrative embodiments can be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The illustrative embodiments recognize and take into account a number of different considerations as described herein. For example, the application logic may cause many of the same SQL statements to be repeatedly executed, using either the same or different parameters. Other SQL statements may execute infrequently, with usage patterns varying over time, for example throughout the workday or work week. An application server can pool and reuse SQL statements. While this can increase server performance and efficiency, pooling too many statements can lead to excessive resource consumption, particularly memory, especially when combined with connection pooling.

Some users may cap statement pools at lower maximums. As a side-effect, SQL statements that would be more likely to be reused may instead be discarded when the application requests to execute a less frequently used SQL statement. This situation may be referred to as churn.

Alternatively, it may be possible to increase the statement pool size enough to allow for the less frequently used SQL statements to remain in the statement pool along with the more frequently used SQL. This configuration has the trade-off of wasting memory, especially considering there is also a statement pool for each connection in the connection pool per the Java database connectivity (JBDC) architecture. In cloud environments, this is costly since memory is charged based on usage, which is an incentive for reducing, instead of increasing memory usage.

As a manual procedure, a systems administration may analyze and research the SQL statements, including their frequency of use. Each place in the application code where an SQL statement is used, code can be added to set a JDBC specification-defined poolability hint that may cause less frequently used SQL statements to not be pooled. Setting the poolability hint tends to avoid churn. As a drawback, this approach assumes the installation owns or has the rights to modify the application code, and that the expertise exists in the installation to properly modify the application code. This approach works well for the very few who are able to leverage it, or in an equally limited number of cases where it can only be partially leveraged because the installation directly controls only a portion of the application code.

Embodiments of the present invention overcome the drawbacks in the present art by automatically adjusting the maximum SQL statement pool size upward to avoid unwanted discards. Additionally, SQL statements that are observed to be infrequently used, which would displace more useful SQL statements, are automatically kept out of the SQL statement pool. Frequency of use can be determined, for example, by whether the SQL statement is used within a number of requests that is within the configurable multiple of the SQL statement pool size.

SQL statements that would cause churn can be automatically identified, for example by request number, and kept out of SQL statement pools. This avoids displacing the more useful SQL statements that are already in the SQL statement pool and should not be discarded.

One or both of these automatic actions may be optionally disabled in favor of receiving system messages recommending that the user manually perform the actions of increasing the maximum SQL statement pool size, and/or setting a poolability hint of false on specific statements.

The present invention may be implemented in any application and integration middleware software layer, such as Open Liberty® (Open Liberty is a registered trademark of IBM in the United States).

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, avoidance of statement pool churn (program) 150. In addition, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122, peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in the program 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in avoidance of statement pool churn (program) 150 typically includes at least some of the computer code involved in performing the inventive methods.

PERIPHERAL DEVICE SET 114 includes the set of peripheral devices of computer 101.

Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
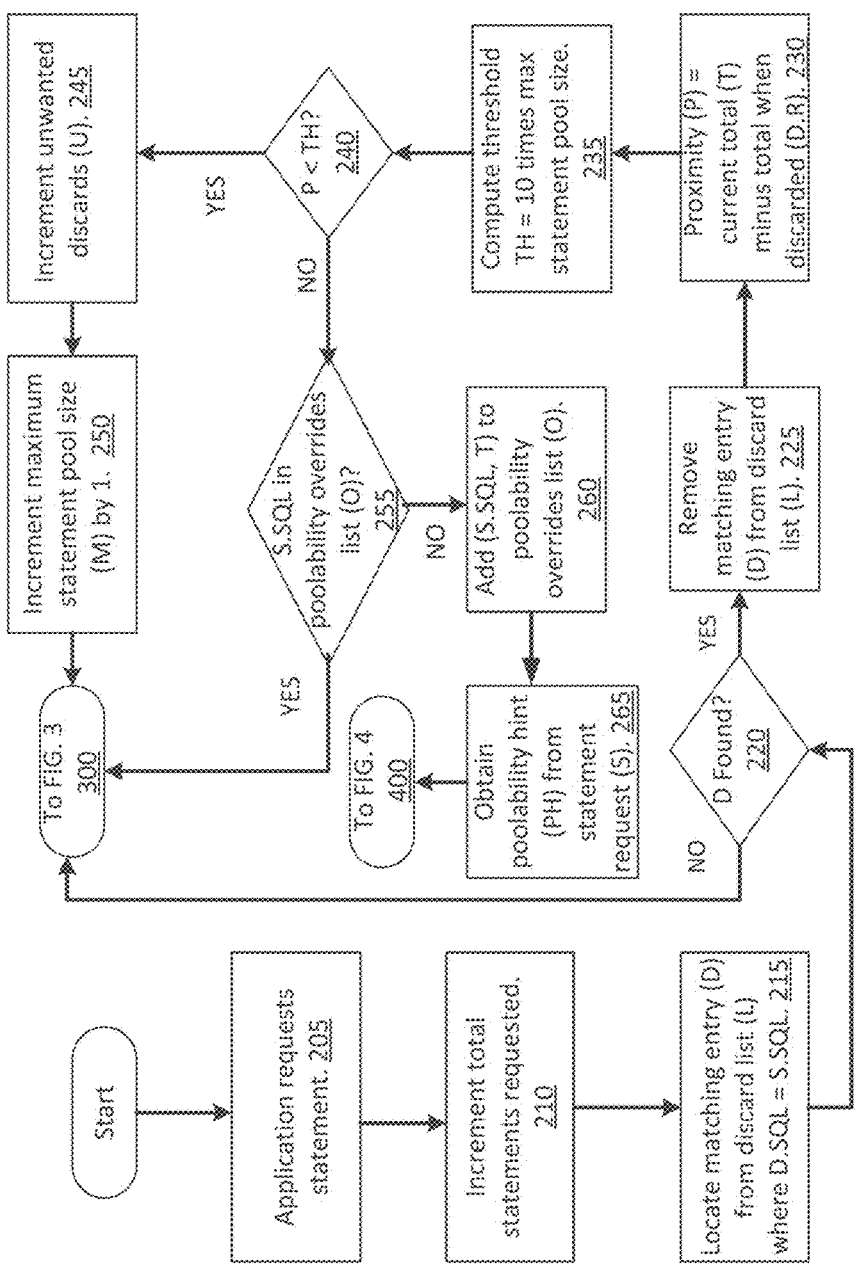
FIG. 2 is a high-level diagram of automatically adjusting statement pool size and adding poolability overrides, in accordance with an illustrative embodiment.

With reference now to FIG. 2 a high-level diagram of automatically adjusting SQL statement pool size and adding poolability overrides is depicted.

In the figure, a SQL statement pool keeps a current request count (T) of total requested SQL statements and a discards list (L) of information about SQL statements that were recently discarded from the SQL statement pool. The term "recent" here refers to all SQL statements that are in the discards list. Once the period discards list maintenance removes a SQL statement from the discards list, it is no longer considered recent.

The information includes the SQL of the discarded statement and the statement request count upon which the discard occurred. Each entry (D) in the discards list includes the SQL (D.SQL) of the discarded statement and the request number (D.R) upon which the discard happened, which is the value of the total current request count (T) at that point in time. The SQL statement pool also maintains a list of poolability hint overrides (O), indicating SQL for which the pool has overridden the statement poolability to be false. The poolability hint is a true/false Boolean indicator of whether or not a SQL statement should be pooled. It is similar to that used in the Java Data Base Connectivity (JDBC) specification and API. The SQL is paired with the most recent request number for the SQL.

Each time the application requests a SQL statement (205), the request for the SQL statement is directed to a SQL statement pool. The application requests the SQL statement from a particular pooled connection, and it is that connection's SQL statement pool that the request is directed to.

The program 150 increments the SQL statement pool total count of statement requests by "1" (T=T+1) (210). Subsequently, the SQL statement pool identifies whether the SQL of the requested statement matches the SQL of any previously discarded statements from the discards list (L) (215). The matching of the SQL is performed as a case sensitive comparison of string (text) values. An optional optimization may be used to trim whitespace characters from the beginning and end of the SQL prior to performing the matching.

Figure 3:
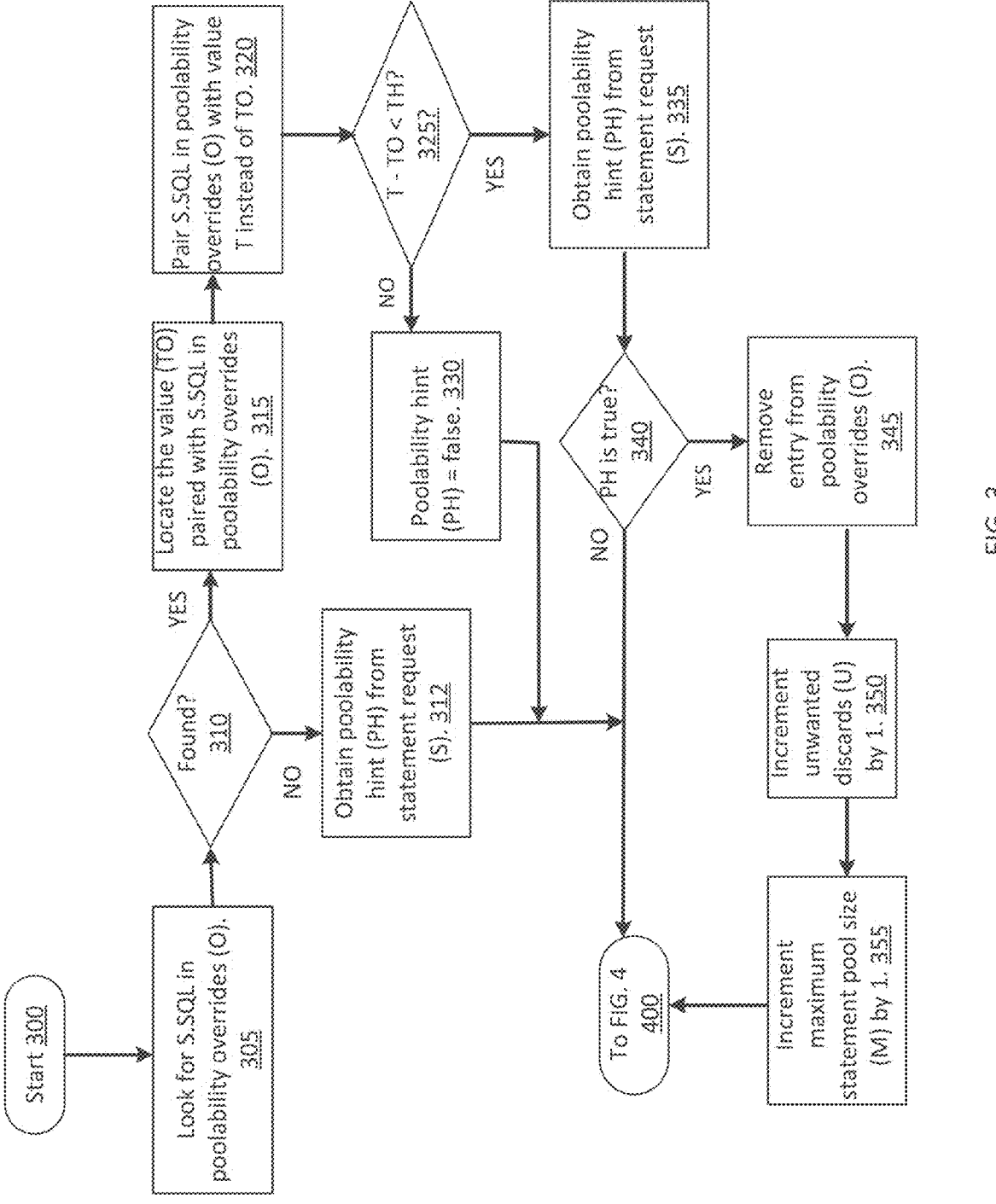
FIG. 3 is a diagram illustrating determining poolability in accordance with an illustrative embodiment.

If a matching entry (D) is not found (220), the program continues to FIG. 3 300. If a matching entry (D) is found (220), the program 150 removes that entry (D) from the discards list (L) (225) and computes the proximity (P) between the new SQL statement request and the discarded SQL statement (which represents its previous usage) as P=T−D.R. (230). In this example, a configurable threshold (TH) is defined as ten times the maximum statement cache size (235). If this proximity (P) is less than the threshold (TH) size (240), then the program 150 considers the discard (which occurred previously) to be an unwanted discard, and increments the number of unwanted discards (U) by "1" (245). Being less than the threshold means that the SQL statement was recently used. The program 150 regrets having discarded it, and would like to make room in the SQL statement pool to avoid discarding it in the future.

To make room for this SQL statement in the SQL statement pool in the future, the program (150) automatically increments the maximum SQL statement pool size (M) by "1" (250). The program 150 continues to FIG. 3 300.

If the proximity (P) is more distant than the threshold (TH) (240), then it is desirable to override its poolability hint to be false (255). In this case, the program 150 saw a discarded statement eventually be reused. However, the fact that the proximity is above the threshold means that a lot of other usage of the SQL statement pool has occurred in between the two times it was used. The prior usage was not very recent, so it is optimal not to pool it.

If it is not desirable (255), the program 150 adds the pairing of the statement SQL and its current request count (T) to the poolability overrides list (O) (260). The program 150 selects the poolability hint (PH) from the SQL statement request(S) (265). The program 150 continues to FIG. 4 400.

Turning now to FIG. 3 300, a diagram is depicted illustrating determining poolability. FIG. 3 300 is entered from either FIG. 2 200, FIG. 2, 255, or FIG. 2 250.

The program 150 searches (by S.SQL) the poolability overrides list (O) to determine when to override the poolability hint (PH) of a SQL statement request(S) with a false value (305). If the SQL statement is found in the poolability overrides list (O) (310), the previous request count (TO) from that entry is updated (315) with the current request count (T) (320). If the SQL statement is not found in the poolability overrides list (O) (310), then the program 150 obtains the poolability hint (PH) from the SQL statement request(S) (312). The program 150 continues to FIG. 4 400.

If the difference between the current request count (T) and the previous request count for that statement (TO) is within the threshold (TH) (325), the SQL statement should be pooled (335), subject to its poolability hint (PH) being true, which is the default poolability hint value (340). The program 150 removes the entry for the SQL statement from the poolability overrides list (O) (345). The unwanted discards (U) are incremented (350), and the maximum statement pool size (M) is automatically increased by "1" to accommodate the additional SQL statement (355). The program 150 continues to FIG. 4 400.

If the difference between TO and T is greater than the threshold (TH) (325), then a poolability hint (PH) of false is used regardless of the poolability hint of the SQL statement request (330). This helps to automatically prevent SQL statements that have been observed to be infrequently used from being added to the SQL statement pool and displacing other more useful statements, thus reducing churn. Frequently is defined as computing a value of T-TO that is less than TH. That is, the proximity in number of statement requests between the current total request number and the total request number as of when the S.SQL was last added or accessed from the poolability overrides list (0) is less than the threshold of the configurable multiple times the maximum statement pool size. The program 150 continues at FIG. 4 400.

Figure 4:
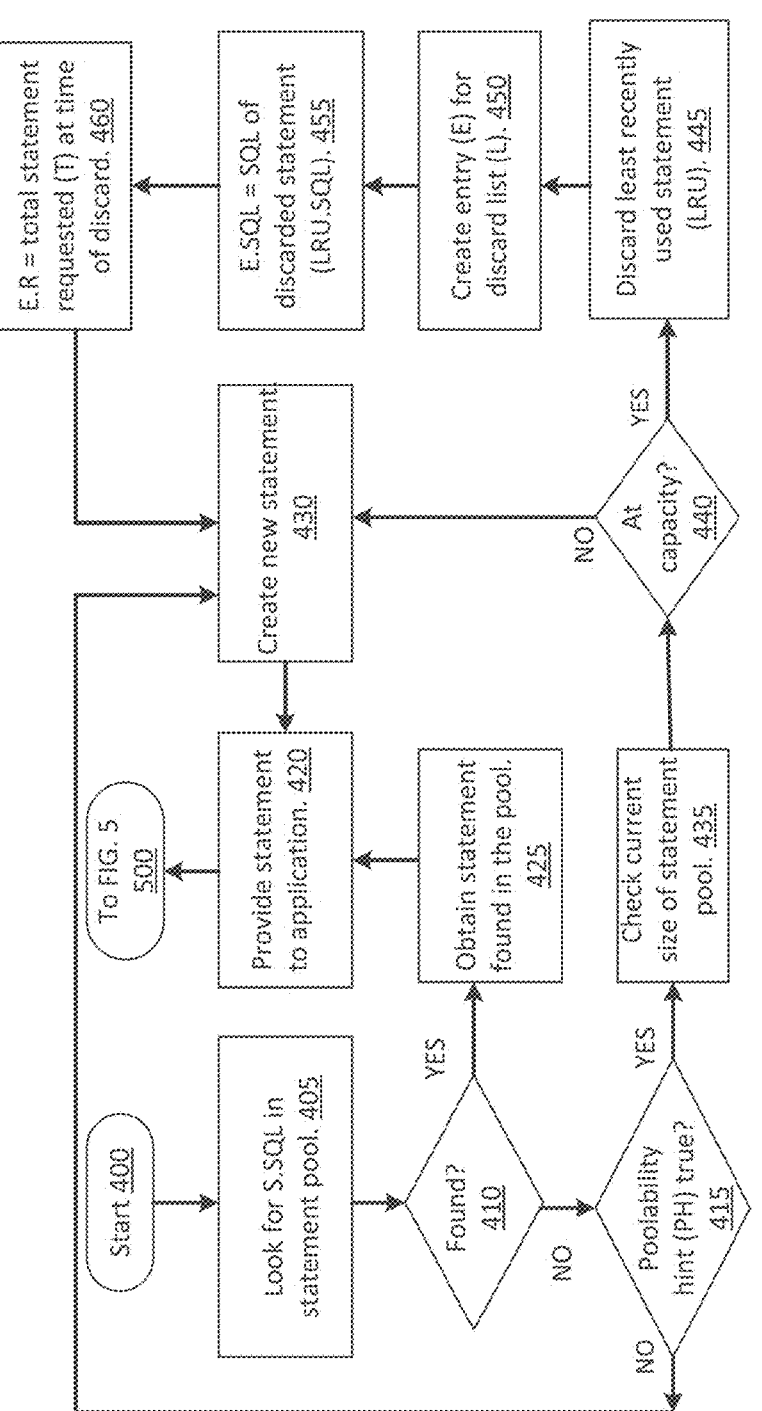
FIG. 4 is a diagram illustrating obtaining a statement in accordance with an illustrative embodiment.

FIG. 4 is a diagram illustrating obtaining a statement. FIG. 4 is entered at 400 from either FIG. 2 265, FIG. 3 330, FIG. 3 340, or FIG. 3 355.

If the program 150 finds a statement with matching SQL in the SQL statement pool (405, 410), the program 150 obtains the statement found in the SQL statement pool (425) sends that statement back to the application (420). The SQL statement is removed from the SQL statement pool while it is in use by the application. The program 150 subsequently adds it back to the pool if the poolability hint indicates that is an optimal course of action. The program continues to FIG. 5 500.

If the statement is not found in the SQL statement pool (410), the poolability hint (PH) is consulted (415). If the statement is not poolable (415), the program 150 creates a new statement to send to the application (430). If the poolability hint is true (PH) then the statement is poolable (415). The program 150 checks the current size of the SQL statement pool (435). If the current size of the SQL statement pool is less than capacity (440), the program 150 creates a new statement to send back to the application (420). The new SQL statement is created such that its SQL is the value of the S.SQL of the statement request: the SQL that the application requested. The program continues at FIG. 5 500.

If at capacity, then the program 150 identifies the least recently used statement in the pool to discard (445). A statement may be randomly selected, or selected by another mechanism as determined by the SQL statement pool implementation. The program 150 removes the discarded statement from the SQL statement pool and closes the statement (450). The program 150 creates a new entry (E) in the discards list (L) comprising the discarded statement SQL (455), and the current request count (T) (460). The program 150 creates a new statement to send to the application (430) (420). The program 150 continues to FIG. 5 500.

Figure 5:
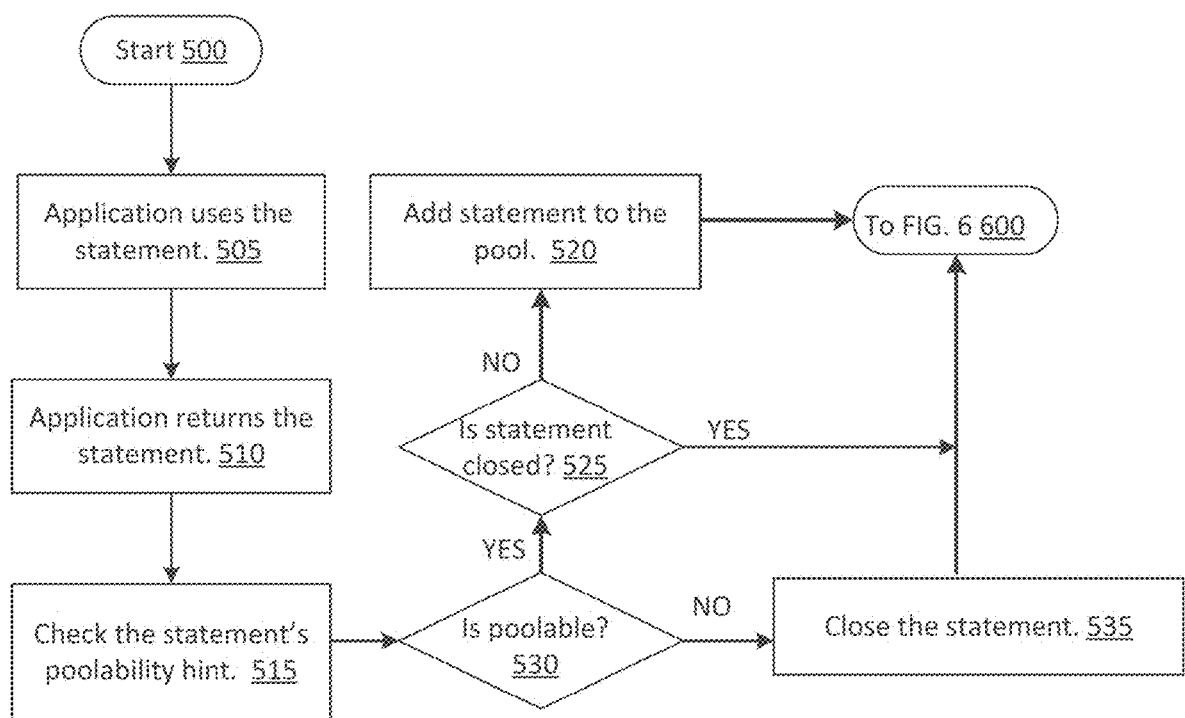
FIG. 5 is a diagram illustrating an application using and returning the statement obtained in FIG. 4 in accordance with an illustrative embodiment.

FIG. 5 is a diagram illustrating an application using and returning the statement obtained in FIG. 4. FIG. 5 500 is entered from FIG. 4 420.

The application uses the SQL statement (505) and eventually returns it to the SQL statement pool upon completion of the processing specified in the SQL statement (510). The program 150 checks the poolability hint of the SQL statement (515). If the SQL statement is poolable (530) and not closed (525), the SQL statement is added to the SQL statement pool (520). The program 150 continues to FIG. 6 600.

Figure 6:
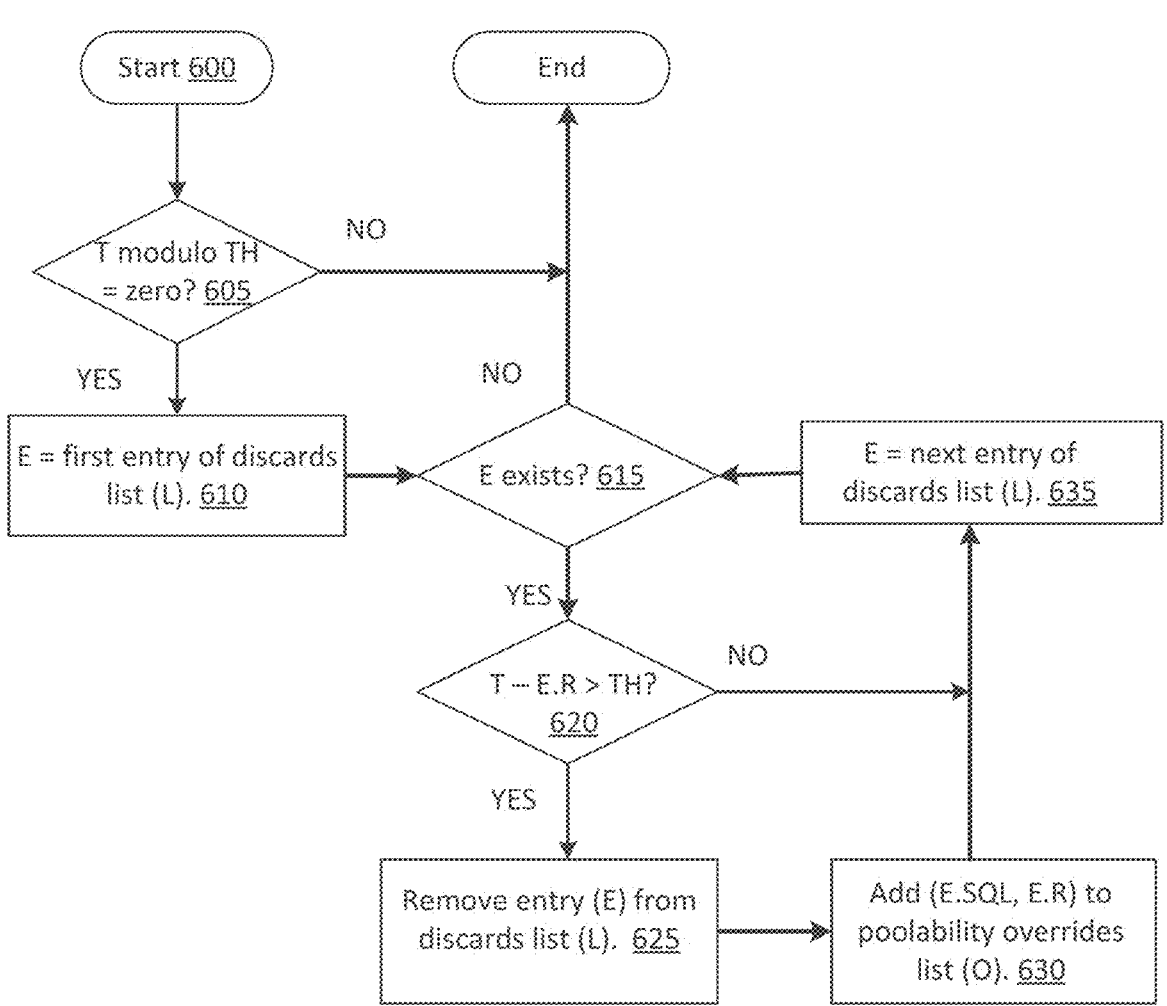
FIG. 6 is a diagram illustrating periodically cleaning up discarded statements in accordance with an illustrative embodiment.

If the SQL statement is not poolable (530), the program 150 closes the SQL statement 535, and the program 150 continues to FIG. 6 600.

If the SQL statement is poolable (530) and closed (525), the program 150 continues to FIG. 6 600.

FIG. 6 is a diagram illustrating periodically cleaning up discarded statements in the discards list (L). FIG. 6 600 is entered from FIG. 5 520, FIG. 5 525, or FIG. 5 535.

In an embodiment, deciding when to perform discards list maintenance is to compute the current request count (T) modulo the threshold (TH). When it does not compute to "0" (605) the program 150 ends.

When T modulo TH="0", the program 150 performs maintenance by stepping through each entry (E) in the discards list (L) (610). If no entry exists (615) the program 150 ends. When the program 150 first starts processing SQL statements, a small number of SQL statements (less than the maximum statement pool size) will likely be reused. In that case, a SQL statement can always be found in the SQL statement pool, so that the discards list will remain empty.

If for that entry (E), the difference between the current request count (T) and the request count (R) at the point of the discard exceeds the threshold (TH) (620), the program 150 removes the entry (E) from the discards list (L) (625). The program 150 adds the SQL for E paired with E.R. to the poolability overrides list (O) (630). The program 150 continues through the entries in the discards list (635), until all entries are processed (615). The program 150 ends.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes," "including," "has," "contains," and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method comprising:

in response to receiving a request for a structured query language (SQL) statement from a requestor, directing the request to a statement pool configured in Java Data Base Connectivity (JDBC) for connections to a database that responds to the requested SQL;

incrementing in the statement pool a current request count of total requested SQL statements, identifying the requested SQL statement as the current request count appended to the requested SQL (S.SQL), and locating a matching discards list entry in a discards list in the statement pool, wherein, a discards list entry comprises the discarded SQL (D.SQL) to which is appended a request number upon which the discard happens, and wherein the matching entry is a case sensitive comparison of string text of the discarded SQL statement to the requested SQL statement;

based on there being the matching entry, removing the matching entry from the discards list, and creating a proximity between the requested SQL statement (S.SQL) and the discarded SQL (D.SQL);

computing a threshold, wherein the threshold is a configurable number times a maximum SQL statement cache size;

determining whether a poolability hint override exists for the requested SQL statement, based on searching a poolability overrides list in the statement pool for the requested SQL statement (S.SQL), wherein the poolability hint is a true/false indicator of whether the requested SQL statement (S.SQL) should be pooled in the statement pool;

providing the requested SQL statement to the requestor; and periodically performing the discards list maintenance.

2. The computer implemented method of claim 1, wherein determining the poolability further comprises:

locating the requested SQL statement in a poolability overrides list;

based on there being a match in the poolability overrides list, locating a previous request count paired with and the requested SQL statement in the poolability overrides list;

pairing the match in the poolability overrides list with the current request count;

based on the current request count minus the previous request count being less than a threshold, and there being a poolability hint in the requested SQL statement, removing the match from the poolability overrides list, incrementing an unwanted discards count, and incrementing a maximum SQL statement pool size; and locating the requested SQL statement in a SQL statement pool.

3. The computer implemented method of claim 1, wherein providing the requested SQL statement to the requestor further comprises:

locating the requested SQL statement in a SQL statement pool; and based on the requested SQL statement being in the SQL statement pool, and there being a poolability hint in the requested SQL statement, and a maximum SQL statement pool size:

discarding a least recently used SQL statement from the SQL statement pool, and adding the least recently used SQL statement to the discards list.

4. The computer implemented method of claim 1, wherein periodically performing discards list maintenance further comprises:

based on the current request count modulo the threshold being zero:

for each entry in the discards list, removing the entry based on a difference between the current request count and a request count when the entry was added to the discards list, and adding the removed entry to the poolability overrides list.

5. The computer implemented method of claim 1, wherein providing the requested SQL statement to the requestor further comprises;

receiving the requested SQL statement from the requestor; and based on the requested SQL statement being poolable adding the requested SQL statement to a SQL statement pool.

6. The computer implemented method of claim 1, wherein the proximity is the current request count minus a request count when the matching entry was discarded.

7. The computer implemented method of claim 1, wherein a request number of a SQL statement is a value of a request count paired with the SQL statement.

8. A computer system comprising:

a number of processor units, wherein the number of processor units executes program instructions to:

in response to receiving a request for a structured query language (SQL) statement from a requestor, directing the request to a statement pool configured in Java Data Base Connectivity (JDBC) for connections to a database that responds to the requested SQL;

incrementing in the statement pool a current request count of total requested SQL statements, identifying the requested SQL statement as the current request count appended to the requested SQL (S.SQL), and locating a matching entry in a discards list in the statement pool, wherein, a discards list entry comprises the discarded SQL (D.SQL) to which is appended a request number upon which the discard happens, and wherein the matching entry is a case sensitive comparison of string text of the discarded SQL statement to the requested SQL statement;

based on there being the matching entry, removing the matching entry from the discards list, and creating a proximity between requested SQL statement (S.SQL) and the discarded SQL (D.SQL);

computing a threshold, wherein the threshold is a configurable number times a maximum SQL statement cache size;

determining whether a poolability hint override exists for the requested SQL statement, based on searching a poolability overrides list in the statement pool for the requested SQL statement (S.SQL), wherein the poolability hint is a true/false indicator of whether the requested SQL statement (S.SQL) should be pooled in the statement pool;

providing the requested SQL statement to the requestor; and periodically performing the discards list maintenance.

9. The computer system of claim 8, wherein determining the poolability further comprises:

locating the requested SQL statement in a poolability overrides list;

based on there being a match in the poolability overrides list, locating a previous request count paired with the requested SQL statement in the poolability overrides list;

pairing the match in the poolability overrides list with the current request count;

based on the current request count minus the previous request count being less than a threshold, and there being a poolability hint in the requested SQL statement, removing the match from the poolability overrides list, incrementing an unwanted discards count, and incrementing a maximum SQL statement pool size; and locating the requested SQL statement in a SQL statement pool.

10. The computer system of claim 8, wherein providing the requested SQL statement to the requestor further comprises:

locating the requested SQL statement in a SQL statement pool; and based on the requested SQL statement being in the SQL statement pool, and there being a poolability hint in the requested SQL statement, and a maximum SQL statement pool size:

discarding a least recently used SQL statement from the SQL statement pool, and adding the least recently used SQL statement to the discards list.

11. The computer system of claim 8, wherein periodically performing discards list maintenance further comprises:

based on the current request count modulo the threshold being zero:

for each entry in the discards list, removing the entry based on a difference between the current request count and a request count when the entry was added to the discards list, and adding the removed entry to the poolability overrides list.

12. The computer system of claim 8, wherein providing the requested SQL statement to the requestor further comprises;

receiving the requested SQL statement from the requestor; and based on the requested SQL statement being poolable adding the requested SQL statement to a SQL statement pool.

13. The computer system of claim 8, wherein the proximity is the current request count minus a request count when the matching entry was discarded.

14. The computer system of claim 8, wherein a request number of a SQL statement is a value of a request count paired with the SQL statement.

15. A computer program product, the computer program product comprising a computer readable storage medium having program instructions embodied therewith, the program instructions executable by a computer system to cause the computer system to perform a method of:

in response to receiving a request for a structured query language (SQL) statement from a requestor, directing the request to a statement pool configured in Java Data Base Connectivity (JDBC) for connections to a database that responds to the requested SQL;

incrementing in the statement pool a current request count of total requested SQL statements, identifying the requested SQL statement as the current request count appended to the requested SQL (S.SQL), and locating a matching entry in a discards list in the statement pool, wherein, a discards list entry comprises the discarded SQL (D.SQL) to which is appended a request number upon which the discard happens, and wherein the matching entry is a case sensitive comparison of string text of the discarded SQL statement to the requested SQL statement;

based on there being the matching entry, removing the matching entry from the discards list, and creating a proximity between the requested SQL statement (S.SQL) and the discarded SQL (D.SQL);

computing a threshold, wherein the threshold is a configurable number times a maximum SQL statement cache size;

determining whether a poolability hint override exists for the requested SQL statement, based on searching a poolability overrides list in the statement pool for the requested SQL statement (S.SQL), wherein the poolability hint is a true/false indicator of whether the requested SQL statement (S.SQL) should be pooled in the statement pool;

providing the requested SQL statement to the requestor; and periodically performing the discards list maintenance.

16. The computer program product of claim 15, wherein determining the poolability further comprises:

locating the requested SQL statement in a poolability overrides list;

based on there being a match in the poolability overrides list, locating a previous request count paired with the requested SQL statement in the poolability overrides list;

pairing the match in the poolability overrides list with the current request count;

based on the current request count minus the previous request count being less than a threshold, and there being a poolability hint in the requested SQL statement, removing the match from the poolability overrides list, incrementing an unwanted discards count, and incrementing a maximum SQL statement pool size; and locating the requested SQL statement in a SQL statement pool.

17. The computer program product of claim 15, wherein providing the requested SQL statement to the requestor further comprises:

locating the requested SQL statement in a SQL statement pool; and based on the requested SQL statement being in the SQL statement pool, and there being a poolability hint in the requested SQL statement, and a maximum SQL statement pool size:

discarding a least recently used SQL statement from the SQL statement pool, and adding the least recently used SQL statement to the discards list.

18. The computer program product of claim 15, wherein periodically performing discards list maintenance further comprises:

based on the current request count modulo the threshold being zero:

for each entry in the discards list, removing the entry based on a difference between the current request count and a request count when the entry was added to the discards list, and adding the removed entry to the poolability overrides list.

19. The computer program product of claim 15, wherein providing the requested SQL statement to the requestor further comprises;

receiving the requested SQL statement from the requestor; and based on the requested SQL statement being poolable adding the requested SQL statement to a SQL statement pool.

20. The computer program product of claim 15, wherein the proximity is the current request count minus a request count when the matching entry was discarded.

* * * * *